Aug. 18, 1959
H. J. LAIMING
2,899,830
SHAFT POSITIONING DEVICE
Filed June 26, 1952
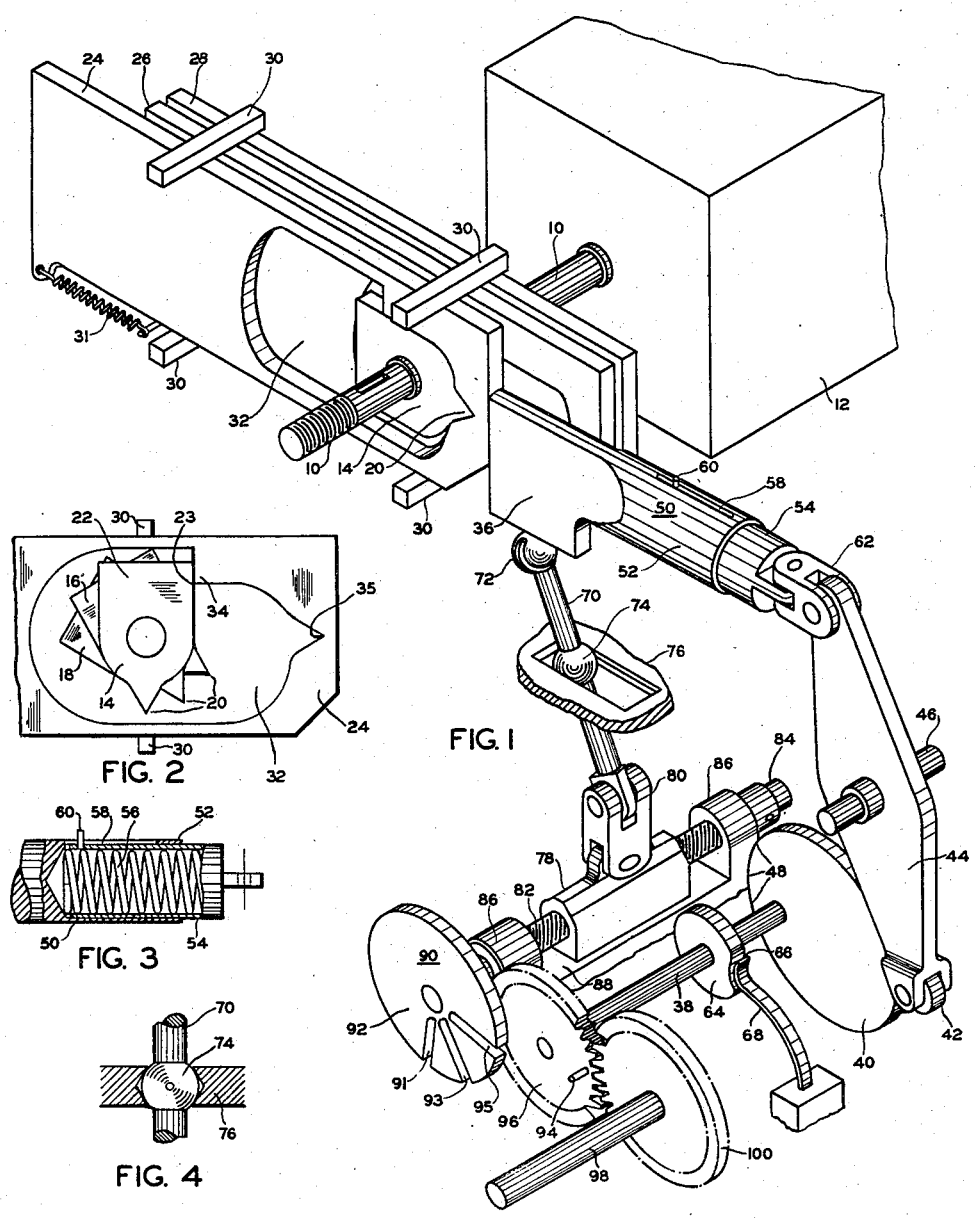
INVENTOR.
HARRY J. LAIMING
BY George Sipkin
J.K.I. Leintzen
ATTORNEYS

United States Patent Office 2,899,830
Patented Aug. 18, 1959

2,899,830

SHAFT POSITIONING DEVICE

Harry J. Laiming, Springfield, Pa., assignor, by mesne assignments, to the United States of America as represented by the Secretary of the Navy Application June 26, 1952, Serial No. 295,637

3 Claims. (Cl. 74—10.29)

The invention described herein may be manufactured and used by or for the Government of the United States of America for governmental purposes without the payment of any royalties thereon or therefor.

This invention relates to shaft positioning devices and more especially to such devices which position the shaft selectively to a plurality of angles of rotation thereof.

It is at times desirable to shift the wave length at which electronic transmitters or receivers are operating. This may conveniently be done by securing one element of a tuning device, such as a variable condenser, to a rotatable shaft and then rotating the shaft to the desired angle. This invention provides a device for automatically rotating such shafts.

It is accordingly an object of this invention to provide novel apparatus for rotating a shaft to a predetermined angle of rotation.

It is another object of this invention to provide a shaft rotating apparatus which is actuated by a simple movement.

It is a further object of the invention to provide electronic tuning elements which are rugged and precise.

Other objects and many of the attendant advantages of this invention will be readily appreciated as the same becomes better understood by reference to the following detailed description when considered in connection with the accompanying sheets of drawings wherein:

Fig. 1 is a view in perspective of the apparatus of this invention;

Fig. 2 is an elevation of the shaft positioning cams of this apparatus;

Fig. 3 is a sectional view of the spring loaded lost-motion mechanism of this apparatus; and Fig. 4 is a view partly in section of the slip universal joint of this apparatus.

Referring now to the various figures, the reference numeral 10 designates a shaft journaled in a casing 12 which houses the electronic tuning device (not shown) to be controlled. A plurality of identical cams 14, 16, and 18 are frictionally secured to the shaft 10 at different angles. While only three cams 14, 16, and 18 are shown in the drawings, it is to be understood that any number of such cams may be secured to the shaft. Each of the cams has an indexing projection 20 and a skirt portion 22 having a flat surface 23.

A series of actuating plates 24, 26, and 28 are adapted for sliding movements in the guides 30 in a direction at right angles to the axis of the shaft 10. Each of the actuating plates 24, 26, and 28 is biased to the right as viewed in Fig. 1 by a spring 31. Each of the actuating plates 24, 26, and 28 has an opening 32 in which one of the cams 14, 16, and 18 is located, the cam 14, for example, being located in the opening 32 of plate 24. Each of the openings 32 is also formed to provide a shoulder 34 which engages the flat surface 23 of the skirt portion 22 of one of the cams 14, 16 and 18 to rotate the cam when the actuating plate slides to the left as viewed in Fig. 1. Each of the openings 32 also has an indentation 35 adapted to engage the indexing projection 20 of one of the cams 14, 16, and 18 to accurately position the respective cams. When the shaft 10 has been thus rotated by the interaction of a plate and a cam, the electronic elements in the casing 12 will also be rotated to effect the tuning of the electronic apparatus.

The plates 24, 26, and 28 are moved by means of a plunger 36 which is adapted for lateral movement opposite to any one of the plates 24, 26, and 28 and for longitudinal movement to move the oppositely located plate 24, 26, or 28 to the left as viewed in Figs. 1 and 2.

The mechanism which moves the plunger 36 longitudinally will now be described. A shaft 38 is journaled for rotation and carries a cam 40 adapted to engage a cam follower 42 journaled at one extremity of a lever 44 which is journaled on a shaft 46 for rotation only.

The cam 40 at its small radius has a dwell portion 48 the purpose of which will be explained subsequently.

The plunger 36 is actuated through a spring biased lost-motion mechanism 50 which comprises a cylinder 52 and a hollow piston 54 located in the cylinder 52. A compression spring 56 is located partly in the hollow piston 54 and partly in the cylinder 52 and biases the piston 54 from the cylinder 52. The compression spring 56 is stiffer than the spring 31. A pin 60 is affixed to the hollow piston 54 and rides in a slot 58 cut in the upper wall of the cylinder 52 to prevent complete expulsion of the piston 54 from the cylinder 52 by the spring 56. A universal joint 62 is located on the outer end of the piston 54 and connects with the upper end of the lever 44.

It will be apparent from the foregoing that when the cam 40 revolves so that the follower 42 engages the portions of larger radius of the cam 40, the plunger 36 will be moved to the left as viewed in Fig. 1, and that the lost-motion mechanism 50 allows for over-travel of the lever 44. It will also be apparent that the plunger 36 will be at its extreme right hand position as viewed in Fig. 1 when the cam follower 42 rides on the dwell portion 48 of the cam 40.

A second cam 64 having a notch 66 is also secured to the shaft 36. A spring 68 is fixedly secured at its lower end as viewed in Fig. 1 and its upper end is biased against the cam 64 to engage the notch 66 when the follower 42 is on the largest radius of the cam 40. The notch 66 and spring 68 serve to impede the rotation of the shaft 38 when the plunger 36 is moved to its extreme left hand position as viewed in Fig. 1. This is a signal to the operator that the change in wave length has been completed.

The mechanism which shifts the plunger 36 laterally from one of the plates 24, 26, or 28 to another will now be described. A lever 70, at its upper end, engages the plunger 36 through a ball and socket joint 72 and at its center slidably engages a ball 74. The ball 74 in turn is slidably engaged in a horizontal retaining slideway 76 positioned to permit the ball 74 to slide in a direction at right angles to the axis of the shaft 38. The lower end of the lever 70 engages a slider 78 through a universal joint 80. The slider 78 engages the threads 82 on a shaft 84 journaled for rotation in the journals 86.

The slider 78 is restrained from rotating with the shaft 84 by an engagement with a flat sliding surface 88.

It will be apparent from the above that when the shaft 84 is rotated in the journals 86, the slider 78 will move along the axis of the shaft and the lever 70 will move the plunger 36 laterally. The plunger 36 is supported solely by the levers 44 and 70. The slideway 76 allows the lever 70 to follow the plunger 36 when it moves longitudinally.

The shaft 84 is actuated by shaft 38 through a Geneva mechanism 90 comprising a disk 92 secured to one end of the shaft 84 and a pin 94 affixed to a gear wheel 96 secured to one end of the shaft 38. The disk 92 is provided with radial slots 91, 93, and 95. The pin 94 is so positioned on the gear wheel that it engages one of the slots 91, 93, and 95 on the disk 92 to rotate the shaft 84 only when the cam follower 42 is on the dwell portion 48 of the cam 40. The Geneva mechanism 90 is thus actuated only when the plunger 36 is stationary at its extreme right hand position as viewed in Fig. 1.

The shaft 38 is rotated through shaft 98 by means of a gear wheel 100 which meshes with the gear wheel 96. The number of teeth on the gear wheel 100 is not equal to the number of teeth on the gear wheel 96 so that when the rotation of the shaft 38 is impeded by the spring 68 entering the notch 66, the shaft 98 will be in a position which differs with each complete revolution of the shaft 38. An indexing device (not shown) may be attached to the shaft 98 to indicate the position of the plunger 36.

Operation

Assume that the plunger 36 is in its extreme right hand position as viewed in Fig. 1 and lies opposite the actuating plate 28, that the disk 92 has been rotated counterclockwise by two notches and that the shaft 38 has been rotated counterclockwise to place the dwell portion 48 of the cam 40 just beyond the follower 42. If the shaft 98 is now rotated clockwise, the plunger 36 and the plate 28 will be moved to the left against the action of spring 31 and rotate the cam 18 to a horizontal position approximately similar to the horizontal position of cam 14 as shown in Fig. 1.

Further clockwise rotation of the shaft 98 will compress the spring 56 and press the indentation 35 tightly over the indexing projection 20 to accurately position the shaft 10. At this point, the notch 66 will engage the spring 68 to impede further rotation of the shaft 98, the shaft 10 will have been rotated by about 30° in the counterclockwise direction and the wave length of the electronic apparatus (not shown) in the casing 12 will have been changed accordingly.

If another change in this wave length is to be made, the shaft 98 is again rotated in a clockwise direction. This allows the spring 56 to expand until the pin 60 hits the end of the slot 58 and thereafter the spring 31 of the plate 28 moves the plate 28 and the plunger 36 to the right. At this point there is no further pressure between the plate 28 and the plunger 36. As the shaft 98 continues in its clockwise rotation, the dwell portion 48 will commence to engage the follower 42 so that no further motion of the lever 44 insues. The pin 94 will engage the lowermost slot of the disk 92 and move the disk 92 in the clockwise direction by one notch. This movement rotates the shaft 84 so that the threads 82 thereof move the slider 78 to the right along the shaft 84. This also moves the plunger from a position opposite to the actuating plate 28 to a position opposite the actuating plate 26.

When the dwell portion 48 of the cam 40 has passed the follower 42, the cam 40 will push the plunger 36 and the actuating plate 26 to the left as viewed in Fig. 1. This places the cam 16 in a horizontal position and further rotates the shaft 10 by about 30°.

Further clockwise rotation of the shaft 98 will cause the cam 14 to be engaged by the actuating plate 24 and placed in the horizontal position shown in Fig. 1. All of the other elements of the apparatus will then also be in the position shown in Fig. 1.

Since the cams 14, 16, and 18 are only frictionally secured to the shaft 10, their angular position on the shaft may be changed to change the angle at which they will position the shaft 10 when actuated.

Obviously many modifications and variations of the present invention are possible in the light of the above teachings. It is therefore to be understood that within the scope of the appended claims the invention may be practiced otherwise than as specifically described.

What is claimed is:

1. In a shaft positioning device, in combination, a first shaft journaled for rotation, a plurality of cams secured to said first shaft to rotate therewith, a plurality of cam actuating members, each of said actuating members being adapted to move through a predetermined path and to cooperate with a selected one of said cams to rotate the shaft to a predetermined position, a plunger mounted for a first movement to a position adjacent a selected one of said actuating members and for a second movement to move the selected actuating member through its predetermined path, and means operative for moving said plunger in sequence through the first and second movements, said means comprising a second shaft, means operative upon rotation of said second shaft for actuating the plunger through its first movement and other means operative upon further rotation of the second shaft for actuating the plunger through its second movement.

2. In a shaft positioning device, in combination, a first shaft journaled for rotation, a plurality of cams secured to said first shaft to rotate therewith, a plurality of cam actuating members, each of said actuating members being adapted to move through a predetermined path and to cooperate with one of said cams to rotate the shaft to a predetermined position, a plunger mounted for a first movement to a position adjacent a selected one of said actuating members and for a second movement to move the selected actuating members through the predetermined path and means for moving said plunger through the first and second movements, said means comprising a second shaft, a drive cam on said second shaft having a dwell portion, a cam follower cooperating with said drive cam, a connection between said cam follower and said plunger for imparting said second movement to said plunger, a third shaft and a connection between said second and said third shafts for imparting rotation to said third shaft only when said second shaft rotates said drive cam through the angle in which said follower engages said dwell portion and means responsive to rotation of said third shaft for imparting said first movement to said plunger.

3. In a shaft positioning device, in combination, a first shaft journaled for rotation, a plurality of cams secured to said first shaft to rotate therewith, a plurality of cam actuating members, each of said actuating members being adapted to move through a predetermined path and to cooperate with one of said cams to rotate the same to a predetermined position, and a plunger adapted for a first movement to a position adjacent a selected one of said actuating members and for a second movement to move the selected actuating member through the predetermined path, and means for moving said plunger through the first and second movements, said means comprising a second shaft and a drive cam on said second shaft having a dwell portion, a cam follower cooperating with said drive cam, a connection between said cam follower and said plunger for imparting said second movement to said plunger, a third shaft having screw threads and carrying a travelling slider, a connection between said second and said third shafts including a Geneva mechanism having a driving pin and a driven wheel, said driving pin being operated by said second shaft and said driven wheel operating said third shaft, whereby rotation of said second shaft operates the driven wheel only while said cam follower engages the dwell portion of the cam.

References Cited in the file of this patent

UNITED STATES PATENTS

| 2,178,958 | Franklin | Nov. 7, 1939 |
| 2,267,409 | Massini | Dec. 23, 1941 |
| 2,292,728 | Walti | Aug. 11, 1942 |
| 2,323,170 | Wassell | June 29, 1943 |
| 2,344,205 | Torbes | Mar. 14, 1944 |
| 2,349,085 | Forstrom | May 16, 1944 |